(12) United States Patent
Widdall et al.

(10) Patent No.: US 8,100,104 B2
(45) Date of Patent: Jan. 24, 2012

(54) TORSION LOCK ENCODER DEVICE FOR INTERNAL COMBUSTION ENGINE

(75) Inventors: Leon A. Widdall, Ann Arbor, MI (US);
Rick L. Williams, Canton, MI (US);
Patrick B. Morgan, New Baltimore, MI (US)

(73) Assignee: Ford Global Technologies, Dearborn, MI (US)

( * ) Notice: Subject to any disclaimer, the term of this patent is extended or adjusted under 35 U.S.C. 154(b) by 902 days.

(21) Appl. No.: 12/133,416

(22) Filed: Jun. 5, 2008

(65) Prior Publication Data
US 2009/0305796 A1 Dec. 10, 2009

(51) Int. Cl.
*F02B 75/06* (2006.01)
*F02B 75/32* (2006.01)
*F02D 41/34* (2006.01)
*F02P 7/073* (2006.01)
*F02P 7/067* (2006.01)

(52) U.S. Cl. .......... 123/192.1; 123/197.1; 123/612; 123/613; 123/617; 73/114.26; 73/114.27

(58) Field of Classification Search .......... 123/197.1, 123/197.3, 197.4, 192.1; 73/114.26–114.29; 74/603; 464/147
See application file for complete search history.

(56) References Cited

U.S. PATENT DOCUMENTS

| | | | |
|---|---|---|---|
| 3,652,883 A | 3/1972 | Cone | |
| 4,041,801 A | 8/1977 | Anderson | |
| 4,317,435 A | 3/1982 | Kohlhage | |
| 4,966,261 A * | 10/1990 | Kohno et al. | 192/3.29 |
| 5,699,253 A * | 12/1997 | Puskorius et al. | 701/111 |
| 5,715,780 A * | 2/1998 | Haller | 123/90.17 |
| 5,931,249 A | 8/1999 | Ellis et al. | |
| 6,208,131 B1 * | 3/2001 | Cebis et al. | 324/165 |
| 6,324,942 B1 * | 12/2001 | Koike et al. | 74/603 |
| 6,905,010 B2 * | 6/2005 | Diemer et al. | 192/70.14 |
| 7,066,016 B2 * | 6/2006 | Wildman | 73/114.26 |
| 7,201,380 B2 | 4/2007 | Branchereau | |
| 2004/0079143 A1 * | 4/2004 | Mayol et al. | 73/119 R |
| 2004/0211640 A1 * | 10/2004 | Fukushima | 192/70.17 |
| 2006/0053958 A1 | 3/2006 | Hada et al. | |
| 2006/0111867 A1 * | 5/2006 | Woody | 702/163 |
| 2006/0260898 A1 * | 11/2006 | Tsuruta et al. | 192/55.1 |
| 2008/0230342 A1 * | 9/2008 | Friedmann et al. | 192/48.1 |
| 2008/0245142 A1 * | 10/2008 | Bowling et al. | 73/114.26 |
| 2008/0308378 A1 * | 12/2008 | Abe et al. | 192/70.12 |
| 2008/0314361 A1 * | 12/2008 | Ruiz | 123/339.11 |
| 2009/0064950 A1 * | 3/2009 | Rayl | 123/90.15 |
| 2009/0283380 A1 * | 11/2009 | Kimmig | 192/48.1 |
| 2009/0305796 A1 * | 12/2009 | Widdall et al. | 464/147 |
| 2010/0212440 A1 * | 8/2010 | Thery | 74/330 |
| 2010/0224436 A1 * | 9/2010 | Shiina et al. | 180/444 |

FOREIGN PATENT DOCUMENTS

EP 0 949 510 10/1999

\* cited by examiner

*Primary Examiner* — Michael Cuff
*Assistant Examiner* — Tea Bajramovic
(74) *Attorney, Agent, or Firm* — Jerome R. Drouillard; Julia Voutyras

(57) ABSTRACT

An internal combustion engine crankshaft assembly includes a crankshaft having an output device, such as a flywheel or crankshaft damper, fastened to the crankshaft. An electronic engine control device is positioned between the crankshaft and the output device. The electronic engine control device includes a generally planar base which contacts both the output device and the crankshaft. The planar base is coated with a pressure-responsive friction-promoting material which causes the output device to be torsionally locked with respect to the crankshaft.

22 Claims, 5 Drawing Sheets

TORSION LOCK ENCODER DEVICE FOR INTERNAL COMBUSTION ENGINE

CROSS REFERENCE TO RELATED APPLICATIONS

None.

BACKGROUND OF THE INVENTION

1. Field of the Invention

The subject matter disclosed herein relates to a crankshaft assembly for a reciprocating internal combustion engine having a crankshaft position encoder which is mounted upon either a crankshaft output flange, or at the front of the crankshaft.

2. Discussion of Prior Art

Reciprocating internal combustion engines, particularly those employed in automotive vehicles, utilize a crankshaft having an output flange to which a flywheel or flex plate is fastened. The friction necessary to transmit torque between the engine's crankshaft and the flywheel is produced at least in part by clamping the flywheel to the output flange by means of threaded fasteners. Unfortunately, as engine output torques have increased, sometimes without a concomitant increase in the engine size, and often through the use power adders such as charge boosters, it has become increasingly difficult to transmit engine torques efficiently. Moreover, if a flywheel or flexplate begins to slip or shift upon a crankshaft, the resulting vibration, while annoying, is only a telltale of far greater problems, because rapid engine destruction may ensue. Although it is known to insert a friction-enhancing washer between a flywheel and a crankshaft output flange, this type of structure is problematic because the washer may be omitted inadvertently during the assembly process, with the result that the engine will likely fail due to slippage of the flywheel with respect to the crankshaft.

Most automotive engines utilize a crankshaft pulley, mounted at the end of the crankshaft opposite the flywheel or flexplate end. Depending upon the particular application, such crankshaft pulleys usually drive a number of accessories, such as a generator, water pump, air conditioning compressor, power steering pump, and others. This duty necessitates a high torque capacity joint between the crankshaft pulley and the crankshaft. While it is known to handle this torque requirement, at least in part, by a key inserted into a keyway defined by slots formed in the crank damper's hub and the crankshaft's pulley mounting surface. This arrangement is not entirely satisfactory, because the majority of the torque load is accommodated by the joint defined by the crankshaft damper bore and the crankshaft's snout. Unfortunately, higher torque operation requires a concomitant increase in the size of the joint, which is sometimes difficult to provide because there is insufficient space to package the joint.

It would be desirable to provide a crankshaft assembly with a friction-enhancing component interposed between the crankshaft and the flywheel or crankshaft pulley, wherein the introduced component is essential to the operation of the engine, to the extent that absence of the component will prevent the engine from operating. This will assure that the higher torque capacity provided by the friction enhancing component is always present during operation of the engine.

SUMMARY OF THE INVENTION

According to an aspect of the present invention, an internal combustion engine crankshaft assembly includes a crankshaft having an output flange, a flywheel fastened to the output flange, and a sensor wheel positioned between the output flange and the flywheel, with the sensor wheel including a generally planar base having a first side in contact with the output flange, and a second side in contact with the flywheel. An integral ring-shaped sensor element circumscribes the generally planar base of the sensor wheel. A pressure-responsive friction-promoting material is applied to both of the first side and the second side of the sensor wheel, whereby the flywheel is torsionally locked with respect to the crankshaft flange.

According to another aspect of the present invention, the generally planar base of the sensor wheel is configured as an annulus having a pilot bore which is engaged with a pilot formed on the crankshaft.

According to another aspect of the present invention, the friction-promoting material applied to the sensor wheel may include a mineral based particulate, or a crystalline diamond composition.

According to yet another aspect of the present invention, the sensor wheel may include a toothed encoder wheel which functions as a crankshaft position encoder wheel.

According to yet another aspect of the present invention, an electronic engine control device may be positioned between the output flange of a crankshaft and a flywheel, with friction promoting material being applied to both the crankshaft and the flywheel sides of the engine control device.

It is an advantage of the present invention that an engine will have increased torque transmitting capability between the engine's crankshaft and the flywheel, which is assured because of the use of an engine control device which must be in place for the engine to operate at all.

It is another advantage of a system according to the present invention that enhanced torque transmitting capability is established between an engine crankshaft and flywheel without the cost of additional components.

It is another advantage of a system according to the present invention that enhanced torque transmitting capability is achievable without increasing the size of crankshaft, flywheel, and crankshaft damper components.

It is another advantage of a system according to the present invention that enhanced torque transmitting capability is achievable with spark ignition, compression ignition and homogeneous charge compression ignition internal combustion engines.

Other advantages, as well as features of the present invention, will become apparent to the reader of this specification.

DETAILED DESCRIPTION OF THE PREFERRED EMBODIMENTS

Figure 1:
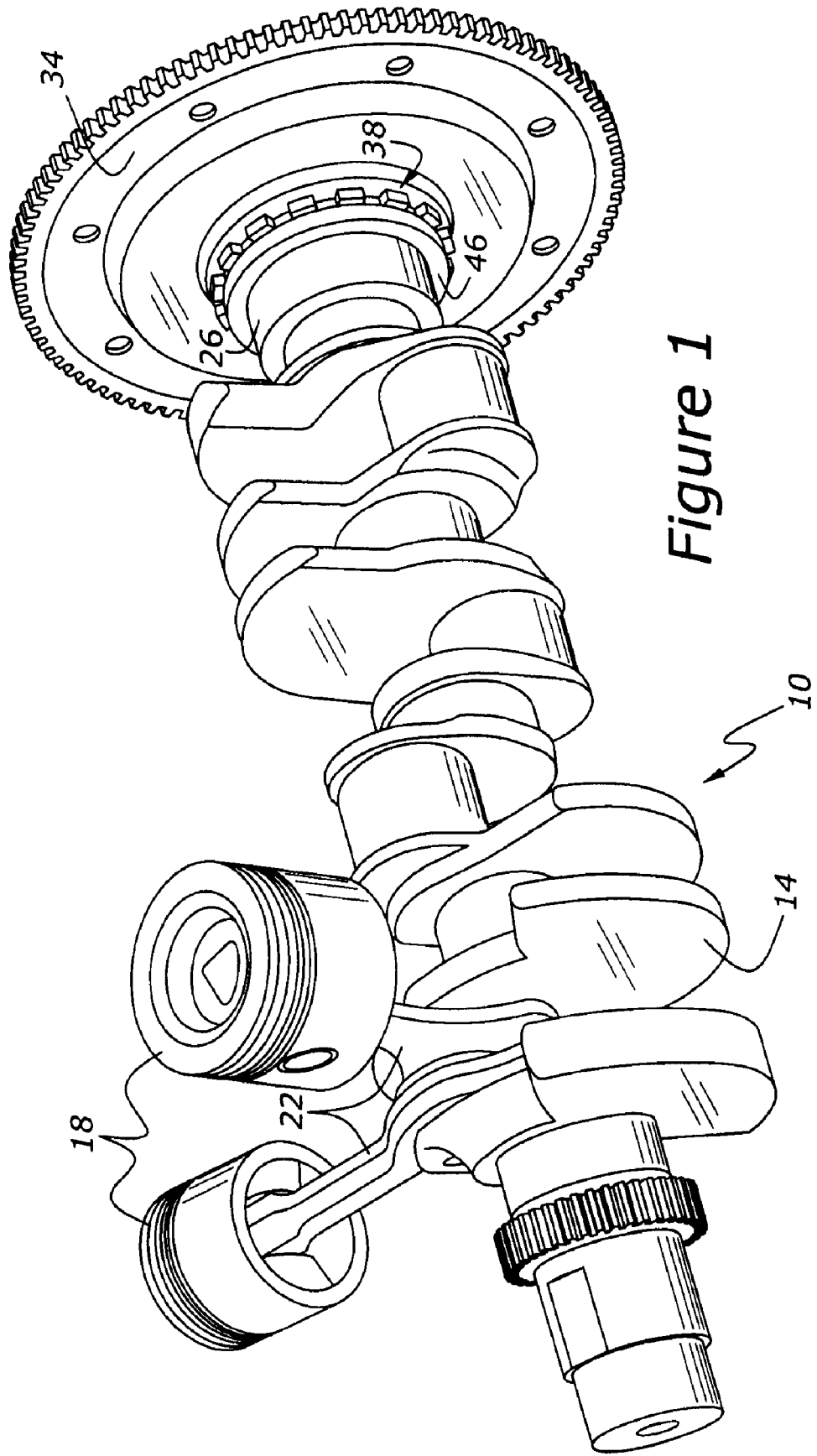
FIG. 1 is a perspective view of a crankshaft assembly according to the present invention.
Figure 2:
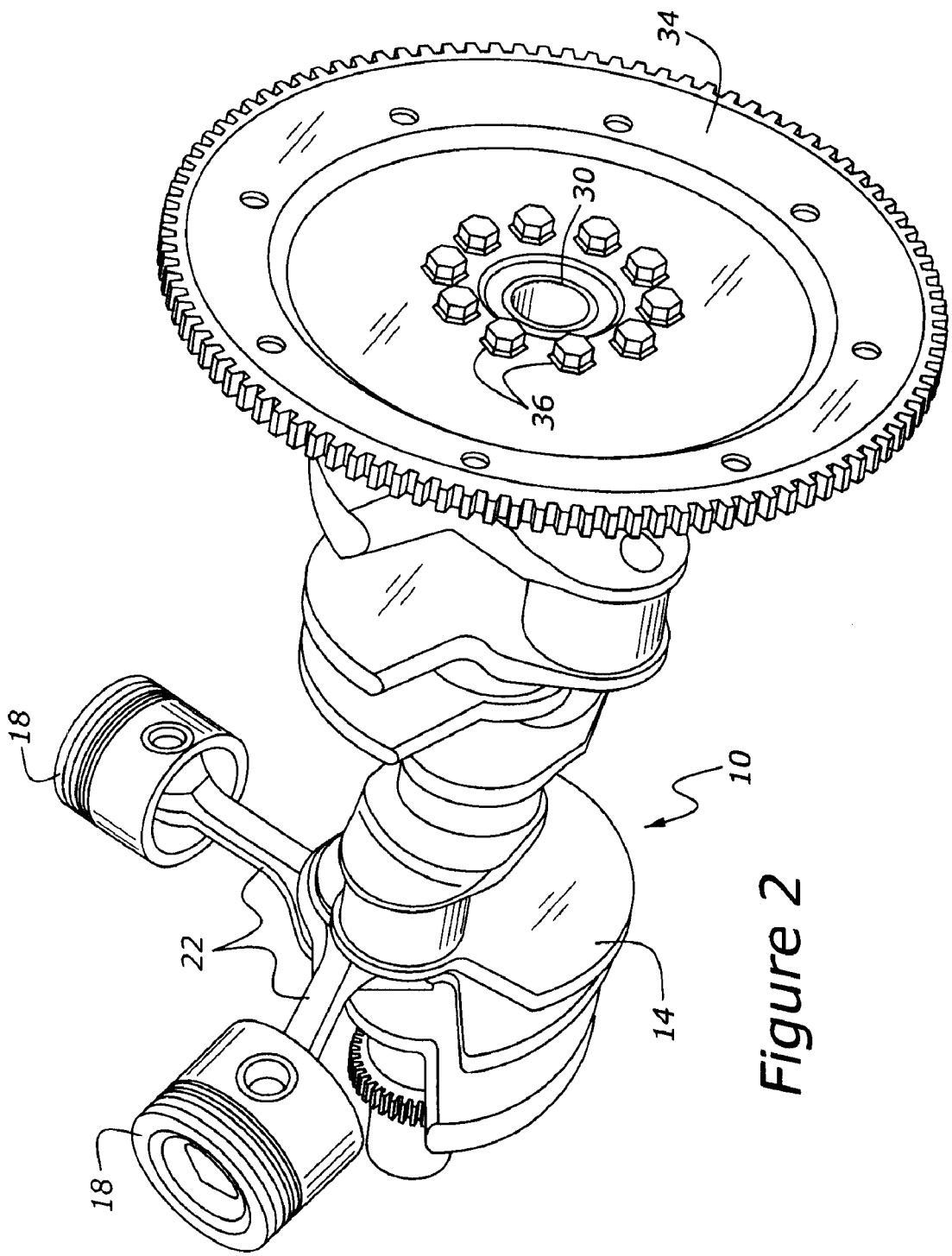
FIG. 2 is perspective view of a crankshaft assembly of FIG. 1, showing a rearward portion of a flywheel.

As shown in FIGS. 1 and 2, crankshaft assembly 10 has a crankshaft 14, to which a number of pistons, 18, are connected by means of connecting rods, 22. Crankshaft 14 has an output flange, 26, which is configured as a right, circular truncated cylinder. Output flange 26 provides mounting for sensor wheel, 38, as well as a flywheel 34. As shown in FIG. 2, flywheel 34 and sensor wheel 38 are mounted to output flange 26 by means of a number of cap screws, 36. Flywheel 34 is centered upon output flange 26 by means of a pilot, 30, which is shown in FIG. 2.

Figure 3:
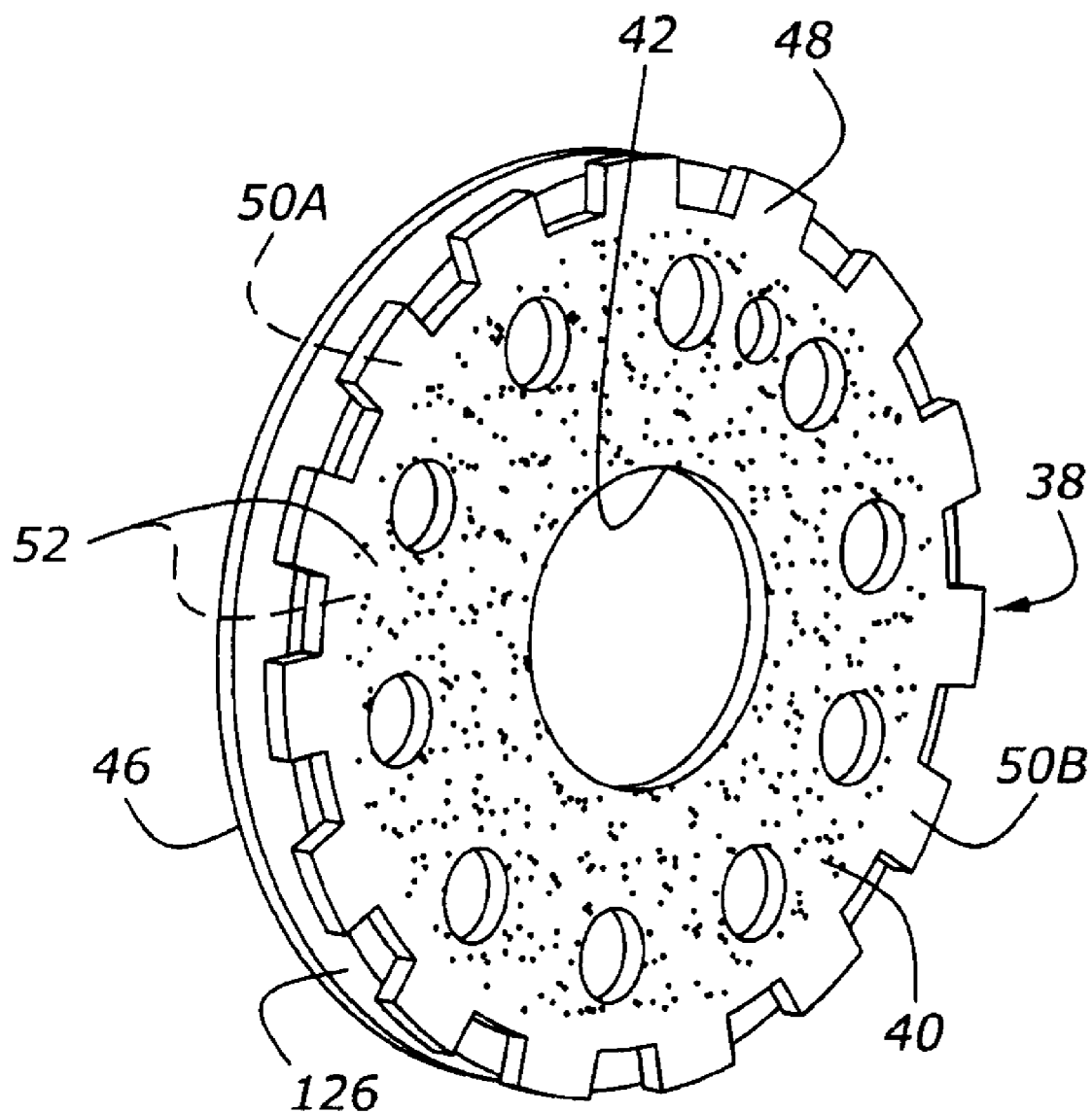
FIG. 3 is a perspective view of an encoder wheel according to one aspect of the present invention.

Details of sensor wheel 38, which comes from a class of control devices such as rotary position encoder wheels which are mountable upon an engine crankshaft, are shown in specificity in FIG. 3. As used herein, the term "control device" means an item of electronic engine control hardware which is essential for operation of the engine. For a spark-ignited engine, a spark coil represents another type of "control device" because such an engine cannot operate without at least one spark coil or other source of high voltage. The illustrated crankshaft encoder is required for operation of the engine's spark and fuel injection timing; in the absence of proper operation of sensor wheel 38, the engine will not run. For compression ignition or "diesel" engines, crankshaft position information is needed to operate the fuel injection system. In any event, sensor wheel 38 includes an encoder ring, 46, with a number of teeth, 48. Ring 46 functions with a conventional pickup (not shown) as a crankshaft position sensor device. Control device 38 has an annular base, 40, with a center aperture, 42, which registers with pilot 30 when sensor wheel 38 has been installed upon crankshaft 14. Sensor wheel 38 has a first side, 50A, which is in contact with output flange 26, and a second side, 50B, which is in contact with flywheel 34. In a preferred embodiment, a friction-promoting material, configured as a crystalline diamond composition, 52, is applied to both sides 50A and 50B of sensor wheel 38. One such material found to be useful for practicing the present invention is a diamond-filled nickel phosphate coating sold by ESK, a Ceradyne Company, under the trade name EKagrip™.

Figure 4:
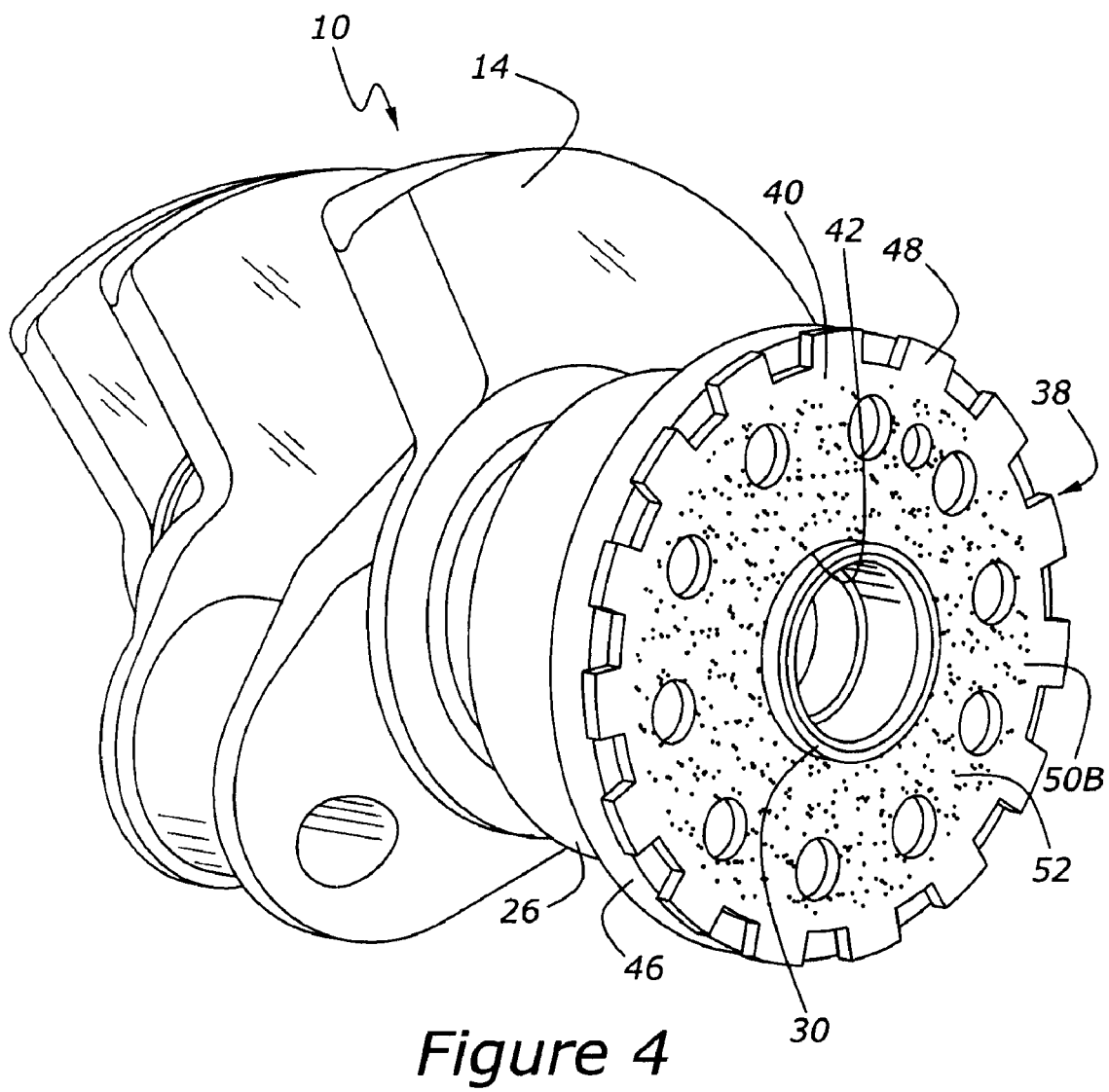
FIG. 4 illustrates the encoder wheel of FIG. 3 having been put in place upon the output flange of a crankshaft.

As shown in FIG. 4, sensor wheel 38 is configured to nest upon output flange 26 so as to compactly install toothed encoder ring 46 in a very small diameter package, and with minimal weight and expense. Notice that a portion of pilot 30 protrudes past the face 50B of sensor wheel 38, so as to permit piloting of flywheel or flex plate 34 upon crankshaft 14. When sensor wheel 38, as specially prepared with friction-promoting material, has been placed between output flange 26, and flywheel 34, and fasteners 36 have been torqued to specification, coating 52, which is described above in a preferred embodiment as a crystalline diamond composition, will cause flywheel 34 to be torsionally locked to crankshaft output flange 26, and for that matter with a balance of crankshaft 14. The previously described diamond-bearing coating is thus said to be pressure-responsive because the act of torquing the flywheel's fasteners creates a clamping force which embeds the freestanding diamond particles into the adjoining metallic surfaces. In turn, this causes the claimed torsional locking of flywheel 34 to crankshaft 14.

Those skilled in the art will appreciate in view of this disclosure that other compositions, such as, without limitation, mineral-based particulates, sometimes configured as abrasive compositions, may be used as a pressure-responsive, friction-promoting material in the present system.

Figure 5:
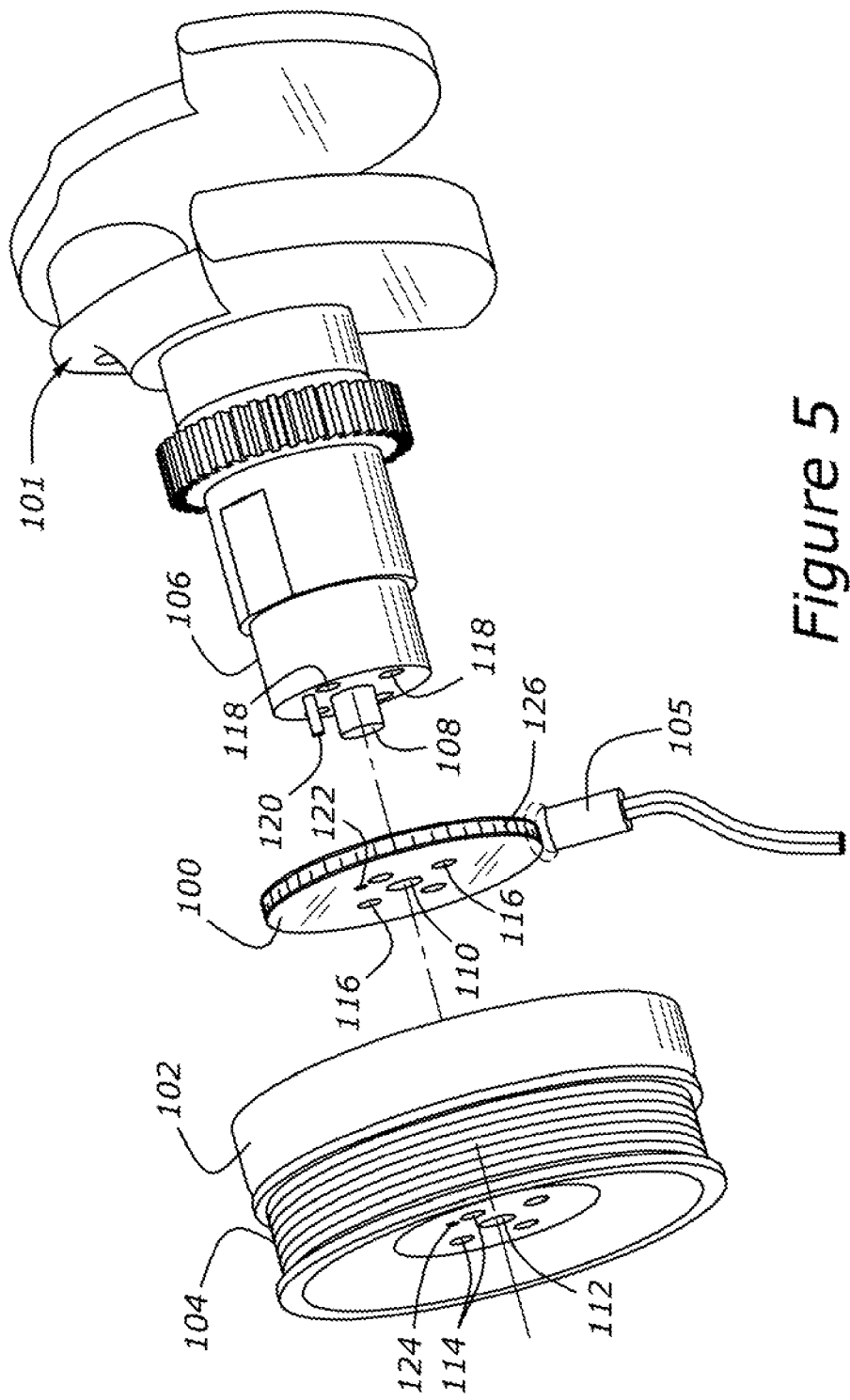
FIG. 5 illustrates an encoder wheel attached to the front end accessory drive portion of a crankshaft according to an aspect of the present invention.

FIG. 5 illustrates an encoder wheel attached to a front end accessory drive portion, 106, of a crankshaft, 101. This portion is opposite the end of the crankshaft to which the flywheel or flexplate is attached. In this embodiment, rotary position encoder wheel 100, which is prepared with friction material as described above, is teamed with a Hall Effect sensor, 105. Encoder wheel 100 has a central pilot hole which is engaged by pilot 108 extending from damper mounting stub 106 of crankshaft 101. Encoder wheel 100 and crankshaft torsional damper 102, including front end accessory drive pulley 104, are mounted to damper mounting stub 106 with a plurality of fasteners extending into threaded holes 118 through apertures 114 in pulley 104, as well as apertures 116 in encoder wheel 100. Dowel 120, which is carried in crankshaft 101, engages aperture 122 in encoder wheel 100, and aperture 124 in pulley 104, to index encoder wheel 100 and damper 102.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An internal combustion engine crankshaft assembly, comprising:
   a crankshaft having a plurality of output ends:
   a power transmission device fastened to at least one of said plurality of output ends; and
   a sensor wheel positioned between said at least one output end and said power transmission device, with said sensor wheel comprising:
   a generally planar base having a first side in contact with said output end, and a second side in contact with said power transmission device;
   an integral, ring-shaped sensor element circumscribing said generally planar base; and
   a pressure-responsive, friction-promoting material applied to both of said first side and said second side of said sensor wheel, whereby said power transmission device is torsionally locked with respect to said at least one output end.

2. An internal combustion engine crankshaft assembly according to claim 1, wherein said power transmission device comprises a flywheel.

3. An internal combustion engine crankshaft assembly according to claim 1, wherein said power transmission device comprises a crankshaft damper.

4. An internal combustion engine crankshaft assembly according to claim 1, wherein said output end comprises an output flange.

5. An internal combustion engine crankshaft assembly according to claim 1, wherein said output end comprises a crankshaft damper mounting stub.

6. An internal combustion engine crankshaft assembly according to claim 1, wherein said friction-promoting material comprises a diamond-filled nickel phosphate coating.

7. An internal combustion engine crankshaft assembly, comprising:
   a crankshaft having an output flange;
   a flywheel fastened to said output flange; and
   a sensor wheel positioned between said output flange and said flywheel, with said sensor wheel comprising:
   a generally planar base having a first side in contact with said output flange, and a second side in contact with said flywheel;
   an integral, ring-shaped sensor element circumscribing said generally planar base; and
   a pressure-responsive, friction-promoting material applied to both of said first side and said second side of said sensor wheel, whereby said flywheel is torsionally locked with respect to said crankshaft flange.

8. A crankshaft assembly according to claim 7, wherein said output flange is configured as a right, circular, truncated cylinder.

9. A crankshaft assembly according to claim 7, wherein said generally planar base of said sensor wheel is configured as an annulus having a pilot bore which is engaged with a pilot formed on said crankshaft.

10. A crankshaft assembly according to claim 7, wherein said friction-promoting material comprises a mineral-based particulate.

11. A crankshaft assembly according to claim 7, wherein said friction-promoting material comprises a crystalline diamond composition.

12. A crankshaft assembly according to claim 7, wherein said sensor wheel comprises a toothed encoder wheel incorporated in a spark timing control system of an engine.

13. A crankshaft assembly according to claim 7, wherein said sensor wheel comprises a crankshaft position encoder wheel for an electronic engine control system.

14. A crankshaft assembly according to claim 7, wherein said flywheel comprises a flexplate.

15. A crankshaft assembly according to claim 7, wherein said flywheel and said sensor wheel are fastened to said output flange by threaded fasteners.

16. An internal combustion engine crankshaft assembly, comprising:
  a crankshaft having an output flange;
  a flywheel fastened to said output flange; and
  an electronic engine control device positioned between said output flange and said flywheel, with said control device comprising:
  a generally planar base having a first side in contact with said output flange, and a second side in contact with said flywheel; and
  a pressure-responsive, friction-promoting material applied to both of said first side and said second side of said control device, whereby said flywheel is torsionally locked with respect to said crankshaft flange.

17. A crankshaft assembly according to claim 16, wherein said engine control device comprises a crankshaft position encoder which is essential to operation of at least one of the spark timing and fuel injection timing of an engine.

18. A crankshaft assembly according to claim 16, wherein said friction-promoting material comprises an abrasive composition.

19. A crankshaft assembly according to claim 16, wherein said friction-promoting material comprises a crystalline diamond composition.

20. A crankshaft assembly according to claim 17, wherein said encoder is essential to operation of a compression ignition engine fuel injection system.

21. An internal combustion engine crankshaft assembly, comprising:
  a crankshaft having a crankshaft damper mounting stub;
  a crankshaft damper fastened to said crankshaft damper mounting stub; and
  an electronic engine control device positioned between said crankshaft damper mounting stub and said crankshaft damper, with said control device comprising:
  a generally planar base having a first side in contact with said crankshaft damper mounting stub, and a second side in contact with said crankshaft damper; and
  a pressure-responsive, friction-promoting material applied to both of said first side and said second side of said control device, whereby said crankshaft damper is torsionally locked with respect to said crankshaft damper mounting stub.

22. A crankshaft assembly according to claim 21, wherein said engine control device comprises a rotary position encoder wheel.

\* \* \* \* \*